United States Patent
Brandt et al.

(10) Patent No.: US 12,071,448 B2
(45) Date of Patent: Aug. 27, 2024

(54) BIO-BASED REACTIVE PLASTICIZER AND ADHESIVES AND SEALANTS CONTAINING THEM

(71) Applicant: Henkel AG & Co. KGaA, Duesseldorf (DE)

(72) Inventors: Adrian Brandt, Essen (DE); Horst Beck, Neuss (DE); Johann Klein, Duesseldorf (DE); Jan-Erik Damke, Dormagen (DE); Sebastian Schmidt, Ratingen (DE); Alexander Kux, Monheim (DE); Johannes Gerardus de Vries, Maastricht (NL); Sandra Hinze, Rostock (DE); Richard van Heck, Leuven (BE)

(73) Assignee: Henkel AG & Co. KGaA, Duesseldorf (DE)

( * ) Notice: Subject to any disclaimer, the term of this patent is extended or adjusted under 35 U.S.C. 154(b) by 947 days.

(21) Appl. No.: 17/003,669

(22) Filed: Aug. 26, 2020

(65) Prior Publication Data

US 2020/0392166 A1 Dec. 17, 2020

Related U.S. Application Data

(63) Continuation of application No. PCT/EP2019/053523, filed on Feb. 13, 2019.

(30) Foreign Application Priority Data

Feb. 27, 2018 (EP) .................................. 18158865

(51) Int. Cl.
*C07F 7/18* (2006.01)
*C08G 61/04* (2006.01)
*C09J 171/02* (2006.01)

(52) U.S. Cl.
CPC .......... *C07F 7/1892* (2013.01); *C07F 7/1804* (2013.01); *C08G 61/04* (2013.01); *C09J 171/02* (2013.01)

(58) Field of Classification Search
CPC ...... C07F 7/1892; C07F 7/1804; C08G 61/04; C09J 171/02
See application file for complete search history.

(56) References Cited

U.S. PATENT DOCUMENTS

| | | | |
|---|---|---|---|
| 2004/0195149 A1* | 10/2004 | Kiser | C10C 3/005 208/22 |
| 2013/0019520 A1* | 1/2013 | Sello | C11C 3/003 44/388 |
| 2013/0345412 A1 | 12/2013 | Garrell et al. | |
| 2016/0009673 A1* | 1/2016 | Kazemizadeh | C08K 5/1515 549/523 |

FOREIGN PATENT DOCUMENTS

| | | |
|---|---|---|
| CN | 101305028 A | 11/2008 |
| CN | 103347947 A | 10/2013 |
| EP | 1093482 81 | 8/2004 |
| EP | 3187558 A1 | 7/2017 |
| EP | 3239158 A1 | 11/2017 |
| JP | 2007514033 A | 5/2007 |
| JP | 2008546879 A | 12/2008 |
| JP | 2009509015 A | 3/2009 |
| JP | 2012158617 A | 8/2012 |
| JP | 2012528204 A | 11/2012 |
| JP | 2013502254 A | 1/2013 |
| JP | 2016521682 A | 7/2016 |
| WO | 2005047394 A1 | 5/2005 |
| WO | 2012129380 A2 | 9/2012 |
| WO | 2016055693 A1 | 4/2016 |

OTHER PUBLICATIONS

Bexell et al (Surface and Coatings Technology, 166 (2003) 141-152, A tribological study of a novel pre-treatment with linseed oil bonded to mercaptosilane treated aluminum). (Year: 2003).*
Turunc et al (Eur. J. Lipid Sci. Technol. 2013. 115, 41-54, The thiol-ene (click) reaction for the synthesis of plant oil derived polymers) (Year: 2013).*
Bexell 2003 (Year: 2003).*
International Search Report issued in connection with International Patent Application No. PCT/EP2019/053523 mailed on Mar. 28, 2019.
Montero De Espinosa, et al, "Sulfur-containing fatty acid-based plasticizers via thiol-ene addition and oxidation: synthesis and evaluation in PVC formulations". Cited in Green Chemistry, 2014, 16, p. 1883-1896. Copyright The Royal Society of Chemistry 2014.

* cited by examiner

*Primary Examiner* — Doris L Lee
(74) *Attorney, Agent, or Firm* — Mary K. Cameron

(57) ABSTRACT

The present invention pertains to reactive (moisture curing) plasticizers; adhesives and sealants containing the plasticizers and methods of bonding and sealing substrates with adhesives and sealants containing the plasticizers.

22 Claims, No Drawings

BIO-BASED REACTIVE PLASTICIZER AND ADHESIVES AND SEALANTS CONTAINING THEM

The present invention pertains to novel reactive (moisture curing) plasticizer and adhesives and sealants containing them to bond and seal substrates. The reactive plasticizers of the invention are bio-based plasticizers derived from plant oils, which are functionalized with mercapto alkoxysilanes. With the new reactive plasticizer according to the present invention adhesives and sealants can be obtained which show reduced or no migration of the plasticizer. Furthermore, their mechanical characteristics can be selectively adjusted, depending on the amount of alkoxysilane groups contained in the plasticizer, which leads to improved adhesives and sealants.

Generally, there are two types of plasticizer, i.e., reactive and non-reactive plasticizer for adhesives and sealants. Commonly plasticizers are based on petrochemicals having no moisture reactive functional groups. A technical advantage of reactive plasticizer is that the migration of classical plasticizer to the surface, which results in adhesion difficulties, is avoided. This is achieved by the chemical reaction of the reactive (functionalized) plasticizer with the other components of the adhesive.

There is recently a desire of the market for sustainable products, which are based on renewable raw materials. In particular, there is a need of adhesives and sealants which contain a high amount of renewable raw materials. By using such materials an essential contribution to sustainability goals, like carbon footprint, can be made. In addition, the performance of those products should at least be equivalent to comparable non sustainable products.

It was an object of the present invention to provide reactive plasticizers based on renewable (bio) materials which can be used in adhesives or sealants which comprise silyl terminated polymers as base polymer.

Until today no reactive plasticizers based on mercapto alkoxysilane modified plant oils are known. It was common knowledge of the skilled person that a functionalization of plant oils with mercapto alkoxysilanes is difficult. In this regard, it was assumed that the sulfur containing compounds would interact with the catalyst in the reaction and inhibit its catalytic activity. In addition, it was assumed that storage of the final adhesive or sealant at higher temperatures would lead to undesired side reactions (for example transesterification between alkoxy silanes and triglycerides) between the employed components, resulting in undesired curing in the cartridge.

The above problems have been solved by the new compounds of formula (I) of the present invention. It has been found by the inventors of the present invention that the specific compounds of formula (I) of the invention are suitable as reactive, and thus non-migrating, plasticizers. An advantageous property compared to conventional plasticizers is the significantly reduced migration of the newly identified compounds. Furthermore, the amount of conventional plasticizer can be lowered when they are partly or completely replaced by the plasticizers according to the invention. Furthermore, it was found that the compounds of the present invention are suitable in the specific adhesive and sealant compositions of the present invention. It was surprisingly found that the specific adhesives and sealants of the present invention can be stored over a long time without curing. Surprisingly, the tensile strength and elongation can be selectively increased or modified. Moreover, it was surprisingly found that the compounds function at the same time as antioxidants when employed in adhesive or sealant compositions.

A "composition" is understood in the context of the present invention as a mixture of at least two ingredients/compounds.

The term "curable" is to be understood to mean that, under the influence of external conditions, in particular under the influence of moisture present in the environment and/or supplied for this purpose, the composition can transform from a relatively flexible state, optionally possessing plastic ductility, to a harder state. In general, crosslinking can take place by means of chemical and/or physical influences, i.e., in addition to the already mentioned moisture, for example, by the supply of energy in form of heat, light or other electromagnetic radiation, but also by simply bringing the composition into contact with air or a reactive component.

While in the Markush formulae in the present invention only the trans configuration at the double bond is depicted for ease of representation, all double bonds in the molecules can independently of each other have cis or trans configuration. Furthermore, all numbers given in the formulae are integers, for example if r is 1 to 3, r is 1, 2 or 3.

The number average molecular weight $M_n$, as well as the weight average molecular weight $M_w$, is—according to the present invention—determined by gel permeation chromatography (GPC, also known as SEC) at 23° C. using a styrene standard. This method is known to one skilled in the art. The polydispersity is derived from the average molecular weights $M_w$ and $M_n$. It is calculated as $PD=M_w/M_n$.

The BET value is determined according to DIN ISO 9277:2014-01.

In the present specification the terms "a" and "an" and "at least one" are the same as the term "one or more" and can be employed interchangeably. "At least one" means one or more, i.e. 1, 2, 3, 4, 5, 6, 7, 8, 9, or more. "At least one", as used herein in relation to any component, refers to the number of chemically different molecules, i.e. to the number of different types of the referenced species, but not to the total number of molecules. For example, "at least one polyol" means that at least one type of molecule falling within the definition for a polyol is used but that also two or more different molecule types falling within this definition can be present, but does not mean that only one molecule of said polyol is present.

All percentages given herein in relation to the compositions or formulations relate to weight % relative to the total weight of the respective composition or formula, if not explicitly stated otherwise.

In the present invention if a group is described to be substituted, preferred substituents are selected from —OH, —OCH$_3$, —F, —Cl, —Br, —I, =O, —NO$_2$, and —NH$_2$.

The present invention in particular pertains to:
1. A compound according to formula (I)

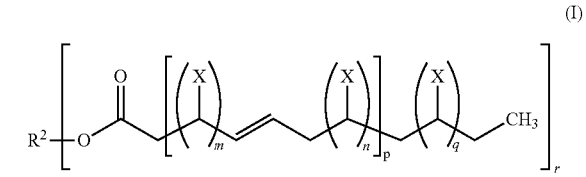

(I)

wherein
m=0 to 25;
n=0 to 25;
q=0 to 50;
p=0 to 5;
r=1 to 3;
whereby in each unit p or r the respective m, n, and q can be independently selected;
X is independently selected from H or —SR$^1$, whereby R$^1$=—(CH$_2$)$_{1-10}$Si(O(CH$_2$)$_{0-8}$CH$_3$)$_3$, preferably —(CH$_2$)$_{1-5}$Si(O(CH$_2$)$_{0-3}$CH$_3$)$_3$, more preferably —(CH$_2$)$_3$Si(OCH$_3$)$_3$ or —(CH$_2$)$_3$Si(O(CH$_2$)$_2$CH$_3$)$_3$, with the proviso that if two or more —SR$^1$ are present they are not bound to neighboring carbon atoms and that the —SR$^1$ groups are not bound to carbon atoms bound to the neighboring carbon atom by a double bond and preferably not bound to carbon atoms in alpha position to a double bond; and
R$^2$=substituted or unsubstituted aliphatic C$_{1-12}$ hydrocarbon group, preferably a saturated unsubstituted aliphatic C$_{1-12}$ hydrocarbon group; more preferably a saturated unsubstituted aliphatic C$_{1-6}$ hydrocarbon group, most preferably a saturated unsubstituted aliphatic C$_{1-3}$ hydrocarbon group.
2. The compound according to aspect 1, wherein
p=1 to 3, preferably 1 or 2, more preferably 1;
m=1 to 25, preferably 2 to 15, more preferably 3 to 10;
n=1 to 25, preferably 2 to 15, more preferably 3 to 10; and
q=0.
3. The compound according to aspect 1, wherein p=0; q=2 to 50, preferably 5 to 40, more preferably 10 to 20.
4. The compound according to any one of aspects 1 to 3, wherein r=1.
5. The compound according to any one of aspects 1 to 3, wherein r=3.
6. The compound according to any one of aspects 1 to 5, wherein 1 to 10 —SR$^1$, preferably 1 to 5 —SR$^1$, more preferably 1 or 2 —SR$^1$, most preferably 1 —SR$^1$, are present.
7. The compound according to aspect 1, wherein the compound of formula (I) is derived from an oil selected from the group of rapeseed oil, soy bean oil, castor oil, linseed oil, palm oil, palm kernel oil, tall oil, jatropha oil, candle nut oil, grapeseed oil, sunflower oil, mid oleic sunflower oil, high oleic sunflower oil, canola oil, corn oil, cashew nut oil or chemically/biotech-made triglycerides like algae oil or trioleate.
8. Method for producing a compound according to formula (I) of any one of aspects 1 to 7, comprising the steps:
reacting a compound according to formula (II)

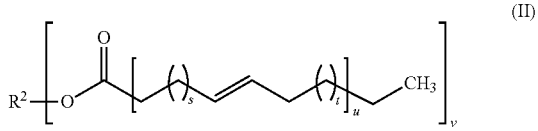

(II)

wherein
s=0 to 101;
t=0 to 101;
u=1 to 20;
v=1 to 3; and
R$^2$ is defined as in aspect 1 with a compound HSR1, whereby R1 is defined as in aspect 1, in the presence of a catalyst.
9. The method according to aspect 8, wherein the reaction is performed at a temperature of 30 to 100° C., preferably 50 to 90° C., more preferably 70 to 85° C.
10. Use of the compound according to any one of aspects 1 to 7 as a reactive plasticizer, preferably as a reactive plasticizer in adhesive compositions.
11. An adhesive or sealant composition, comprising
A) at least one silyl terminated polymer;
B) at least one compound according to any one of aspects 1 to 7;
C) optionally at least one filler; and
D) optionally one or more auxiliary substances.
12. The adhesive or sealant composition according to aspect 11, wherein the amount of the at least one compound B is 0.1 to 30 wt.-%, based on the total weight of the composition.
13. The adhesive or sealant composition according to aspect 11 or 12, wherein the composition comprises or consists of:
10 to 80 wt.-%, preferably 10 to 50, more preferably 15 to 35 of A;
0.1 to 30 wt.-% preferably 0.1 to 20, more preferably 1 to 10 of B;
0 to 70 wt.-% preferably 20 to 60, more preferably 30 to 50 of C; and
0 to 60 wt.-% preferably 1 to 30, more preferably 1 to 10 of D It was found that depending on the number of added silyl groups and the nature (base structure) of the reactive plasticizer, like triglyceride or methyl ester, the tensile strength can be modified. In particular, a lower number of alkoxy silyl groups resulted in flexible adhesives while with higher numbers the brittleness increased. Not wishing to be bound by any theory, it is assumed that the reactive plasticizer underwent a partial transesterification with other components of the composition. The transesterification happens without a significant increase in viscosity of the composition and undesired curing during storage was not observed. By means of the chemical modification of the compounds of the present invention, during storage, better uptake and bonding with the other components of the composition seem to take place. Thus, it is possible to selectively adjust the mechanical characteristics from soft and elastic to hard and brittle, depending upon the amount of alkoxysilyl groups as well as the nature of reactive plasticizer. Another option to adjust the mechanical characteristics is to employ compounds of the present invention, which are not fully saturated, i.e., still have double bonds left in their structure. They have the additional benefit to be even more sustainable by reducing the amount of raw materials required. A further technical advantage of the compounds of the present invention is that they can, via their thioether groups, act as antioxidant as well. In particular, the thioether group can be oxidized to sulfones when contacted with radicals. Therefore, commonly used antioxidants in adhesives or sealants can be added in lower amounts or use thereof can be completely avoided.

For obtaining the compounds according to the present invention, compounds comprising at least one double bond are reacted with the mercapto alkoxy silyl compounds of the formula HSR$^1$, as defined above. This is done in the presence of a catalyst. Suitable commonly known catalysts include, e.g., azo compounds like azobisisobutyronitrile, 1,1'-azobis(cyclohexanecarbonitrile), and azobenzene, and peroxides like dibenzoyl peroxide, di-tert-butyl peroxide, methyl ethyl ketone peroxide, acetone peroxide, hydrogen peroxide, peroxodisulfate, and benzophenone, 2,2-dimethoxy-2-phenylacetophenone, 1-benzoylcyclohexanol, methyl ethyl ketone, can be employed as well. However, also UV-light and common photoinitiators can be used. Heat induced radical reactions are preferred.

When reference is made to the feature that "the —SR$^1$ groups are not bound to carbon atoms bound to the neighboring carbon atom by a double bond", this means that in a double bond structural element of the formula —H$_2$C=CH$_2$—, the —SR$^1$ cannot replace any of the hydrogen atoms bound to the carbon atoms that form the double bond. Similarly, the feature that the —SR' groups are "not bound to carbon atoms in alpha position to a double bond" means that they are not bound to the carbon atoms marked by an asterisk in a structural element of the formula —C*H$_2$—CR$_2$=CR$_2$—C*H$_2$—, with R being H or alkyl.

The present invention also relates to adhesive or sealant compositions, in the following only referred to as "composition(s)", comprising the specific compounds of the present invention. The adhesive or sealant compositions are preferably curable compositions.

While the compositions can comprise further reactive or non-reactive plasticizer(s), different from the compounds according to the present invention and commonly known to the skilled person, in a preferred embodiment not more than 10 wt.-%, preferably not more than 5 wt.-%, more preferably not more than 0.5 wt.-%, most preferably not more than 0.001 wt.-% of additional plasticizer(s) are present. In a further preferred embodiment, the composition is free of any additional plasticizer(s).

The compositions comprise at least one base polymer. Suitable polymers are for example polymers having at least one terminal group of the general formula (III)

-A$_n$-R—SiXYZ       (III), wherein
A is a divalent or trivalent bonding group containing at least one heteroatom,
R is selected from divalent hydrocarbon residues having 1 to 12 carbon atoms,
X, Y, Z are, independently, selected from the group consisting of a hydroxyl group and C$_1$ to C$_8$ alkyl, C$_1$ to C$_8$ alkoxy, and C$_1$ to C$_8$ acyloxy groups, wherein X, Y, Z are substituents directly bound with the Si atom or the two of the substituents X, Y, Z form a ring together with the Si atom to which they are bound and at least one of the substituents X, Y, Z is selected from the group consisting of a hydroxyl group, C$_1$ to C$_8$ alkoxy and C$_1$ to C$_8$ acyloxy groups, and n is 0 or 1.

In preferred embodiments, the polymer has at least two terminal groups of the general formula (III).

The polymer having the at least one terminal group of the general formula (III) is preferably a polyether, a poly(meth)acrylic acid ester, or a polyurethane.

A "polyether" is understood to be a polymer in which the organic repeating units comprise ether functionalities C—O—C in the main chain. Polymers having lateral ether groups, such as cellulose ethers, starch ethers and vinyl ether polymers, as well as polyacetals such as polyoxymethylene (POM) are not included in the polyethers.

A "poly(meth)acrylic acid ester" is understood to be a polymer based on (meth)acrylic acid esters, which therefore has as a repeating unit the structural motif —CH$_2$—CR$^a$(COOR$^b$)—, where R$^a$ denotes a hydrogen atom (acrylic acid ester) or a methyl group (methacrylic acid ester) and R$^b$ denotes linear alkyl residues, branched alkyl residues, cyclic alkyl residues and/or alkyl residues comprising functional substituents, for example methyl, ethyl, isopropyl, cyclohexyl, 2-ethylhexyl or 2-hydroxyethyl residues.

A "polyurethane" is understood to be a polymer which has at least two urethane groups —NH—CO—O— in the main chain.

The polymer containing at least one terminal group of the general formula (III) is preferably a polyether. Polyethers have a flexible and elastic structure and allow production of compositions having excellent elastic properties. Polyethers are not only flexible in their backbone, but at the same time strong. Thus, for example, polyethers are not attacked or decomposed by water and bacteria, in contrast to, e.g., polyesters.

The number average molecular weight M$_n$ of the polyether on which the polymer is based is preferably 2000 to 100,000 g/mol (daltons), particularly preferably at least 6000 g/mol and in particular at least 8000 g/mol. Number average molecular weights of at least 2000 g/mol are advantageous for the polyethers used in the present invention, because compositions according to the invention based on polyethers with such a minimum molecular weight have significant film-forming properties. For example, the number average molecular weight M$_n$ of the polyether is 4000 to 100,000, preferably 8000 to 50,000, particularly preferably 10,000 to 30,000 and in particular 10,000 to 25,000 g/mol. These molecular weights are particularly advantageous, since the corresponding compositions have a balanced ratio of viscosity (ease of processing), strength and elasticity.

Particularly advantageous viscoelastic properties can be achieved, if polyethers having a narrow molecular weight distribution, and thus low polydispersity, are used. These can be obtained, for example, by so-called double metal cyanide catalysis (DMC catalysis). Polyethers produced in this way are distinguished by a particularly narrow molecular weight distribution, by a high average molecular weight and by a very low number of double bonds at the ends of the polymer chains.

In a preferred embodiment of the present invention, the maximum polydispersity M$_w$/M$_n$ of the polyether, upon which the polymer is based, is therefore 3, more preferably 1.7 and most preferably 1.5.

The ratio Mw/Mn (polydispersity) indicates the width of the molecular weight distribution and thus of the different degrees of polymerization of the individual chains in polydisperse polymers. For many polymers and polycondensates, a polydispersity value of about 2 applies. Strict monodispersity would exist at a value of 1. A low polydispersity of, for example, less than 1.5 indicates a comparatively narrow molecular weight distribution, and thus the specific expression of properties associated with molecular weight, such as e.g., viscosity. In particular, therefore, in the context of the present invention, the polyether on which the polymer A is based has a polydispersity (M$_w$/M$_n$) of less than 1.3.

In preferred embodiments the polymer having at least one terminal group of the general formula (III) can be a polyurethane obtainable by reacting at least i) a polyol or a mixture of two or more polyols and ii) a polyisocyanate or a mixture of two or more polyisocyanates.

A "polyol" is understood to be a compound, which contains at least two OH groups, irrespective of whether the compound contains other functional groups. However, a polyol used in accordance with the present invention preferably contains only OH groups as functional groups or, if other functional groups are present, none of these other functional groups is reactive at least to isocyanates under the conditions prevailing during the reaction of the polyol(s) and polyisocyanate(s).

The polyols suitable for preparing the polyurethane according to the invention are preferably polyether polyol. The above descriptions about the molecular weight and polydispersity of the polyether apply to the polyether polyol. The polyether polyol is preferably a polyalkylene oxide, particularly preferably polyethylene oxide and/or polypropylene oxide. In preferred embodiments, a polyether or a mixture of two polyethers are used.

The polyols to be used in accordance with the invention have an OH value of preferably about 5 to about 15 and, more preferably, of about 10. The percentage content of primary OH groups should be below about 20%, based on all the OH groups, and is preferably below 15%. In one particularly advantageous embodiment, the acid value of the polyethers used is below about 0.1, preferably below 0.05 and, more preferably, below 0.02.

Besides the polyethers, the polyol mixture may contain other polyols. For example, it may contain polyester polyols with a molecular weight of about 200 to about 30,000 g/mol.

A "polyisocyanate" is understood to be a compound, which has at least two isocyanate groups —NCO. This compound does not have to be a polymer, and instead is frequently a low molecular compound.

The polyisocyanates suitable for preparing the polyurethane according to the invention include ethylene diisocyanate, 1,4-tetramethylene diisocyanate, 1,4-tetramethoxybutane diisocyanate, 1,6-hexamethylene diisocyanate (HDI), cyclobutane-1,3-diisocyanate, cyclohexane-1,3- and -1,4-diisocyanate, bis(2-isocyanatoethyl)fumarate, 1-isocyanato-3,3,5-trimethyl-5-isocyanatomethylcyclohexane (isophorone diisocyanate, IPDI), 2,4- and 2,6-hexahydrotoluylene diisocyanate, hexahydro-1,3- or -1,4-phenylene diisocyanate, benzidine diisocyanate, naphthalene-1,5-diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-toluylene diisocyanate (TDI), 2,4'-diphenylmethane diisocyanate, 2,2'-diphenylmethane diisocyanate, or 4,4'-diphenylmethane diisocyanate (MDI), and the isomeric mixtures thereof. Also suitable are partially or completely hydrogenated cycloalkyl derivatives of MDI, for example completely hydrogenated MDI (H12-MDI), alkyl-substituted diphenylmethane diisocyanates, for example mono-, di-, tri-, or tetraalkyldiphenylmethane diisocyanate and the partially or completely hydrogenated cycloalkyl derivatives thereof, 4,4'-diisocyanatophenylperfluorethane, phthalic acid-bis-isocyanatoethyl ester, 1 chloromethylphenyl-2,4- or -2,6-diisocyanate, 1-bromomethylphenyl-2,4- or -2,6-diisocyanate, 3,3'-bis-chloromethyl ether-4,4'-diphenyl diisocyanate, sulfur-containing diisocyanates such as those obtainable by reacting 2 moles diisocyanate with 1 mole thiodiglycol or dihydroxydihexyl sulfide, diisocyanates of dimer fatty acids, or mixtures of two or more of the named diisocyanates. The polyisocyanate is preferably IPDI, TDI or MDI.

Other polyisocyanates suitable for use in accordance with the invention are isocyanates with a functionality of three or more obtainable, for example, by oligomerization of diisocyanates, more particularly by oligomerization of the isocyanates mentioned above. Examples of such tri- and higher isocyanates are the triisocyanurates of HDI or IPDI or mixtures thereof or mixed triisocyanurates thereof and polyphenyl methylene polyisocyanate obtainable by phosgenation of aniline/formaldehyde condensates.

There is preferably a stoichiometric excess of NCO groups of the polyisocyanates present with respect to the hydroxy groups of the polyols, "the polyols" and "the polyisocyanates" in each case also encompassing the presence of only one polyol and/or only one polyisocyanate. This stoichiometric excess must exist under the process conditions; i.e., it is not sufficient when the excess is nominally present, but a portion of the NCO groups of the polyisocyanates reacts with reactants other than the OH groups of the polyols, for example with monofunctional alcohols, so that there is a de facto shortage of NCO groups of the polyisocyanates with respect to the OH groups of the polyols. The ratio of the number of OH groups of the polyols to the number of NCO groups of the polyisocyanates is particularly preferably 1:3 to 1:1.1, in particular 1:2.5 to 1:1.5.

A further suitable polymer having terminal groups according to formula (III):

-An-R—SiXYZ                                    (III), is one wherein A is a divalent or trivalent bonding group containing at least one heteroatom, R is selected from divalent hydrocarbon residues having 1 to 12 carbon atoms, X, Y, Z are, independently of one another, selected from the group consisting of a hydroxyl group and C1 to C8 alkyl, C1 to C8 alkoxy, and C1 to C8 acyloxy groups, wherein X, Y, Z are substituents directly bound with the Si atom or the two of the substituents X, Y, Z form a ring together with the Si atom to which they are bound, and at least one of the substituents X, Y, Z is selected from the group consisting a hydroxyl group, C1 to C8 alkoxy and C1 to C8 acyloxy groups, and n is 0 or 1.

In this context, the divalent or trivalent bonding group A comprising at least one heteroatom is understood to be a divalent or trivalent chemical group which links the polymer backbone of the silane-terminated polymer with the residue R of the formula (III). For example, the divalent or trivalent linking group A can be formed for example during the production of the alkoxysilane- and/or acyloxysilane-terminated polymer, for example as an amide or urethane group by the reaction of a polyether which is functionalized with hydroxy groups with an isocyanatosilane. The linking group can be either capable or incapable of being differentiated from structural features occurring in the underlying polymer backbone. The latter is the case, for example, if it is identical with the linking points of the repeating units of the polymer backbone.

The index "n" corresponds to 0 (zero) or 1, i.e., the divalent linking group A links the polymer backbone with the residue R (n=1) or the polymer backbone is bound or linked directly with the residue R (n=0).

In some embodiments, the divalent or trivalent linking group A in the general formula (III) is preferably an oxygen atom or an

group, wherein R" is selected from the group consisting of a hydrogen atom, and alkyl or aryl residues having 1 to 12 carbon atoms, or is a substituted or unsubstituted amide, carbamate, urethane, urea, imino, carboxylate, carbamoyl, amidino, carbonate, sulfonate or sulfinate group. Particularly preferred as linking group A are urethane and urea groups, which can be obtained by reacting certain functional groups of a prepolymer with an organosilane, which carries a further functional group. Urethane groups can be formed, for example, either when the polymer backbone comprises terminal hydroxy groups and isocyanatosilanes are used as a further component, or conversely when a polymer having terminal isocyanate groups is reacted with an alkoxysilane comprising terminal hydroxy groups. Similarly, urea groups can be obtained if a terminal primary or secondary amino group—either on the silane or on the polymer—is used, which reacts with a terminal isocyanate group that is present in the respective reactant. This means that either an aminosilane is reacted with a polymer having terminal isocyanate groups or a polymer that is terminally substituted with an amino group is reacted with an isocyanatosilane.

Urethane and urea groups advantageously increase the strength of the polymer chains and of the overall crosslinked polymer.

The residue R is a divalent hydrocarbon residue having 1 to 12 carbon atoms. The hydrocarbon residue can be a linear, branched or cyclic alkylene residue. The hydrocarbon residue can be saturated or unsaturated. R is preferably a divalent hydrocarbon residue having 1 to 6 carbon atoms. The curing rate of the composition can be influenced by the length of the hydrocarbon residues which form one of the binding links or the binding link between polymer backbone and silyl residue. Particularly preferably, R is a methylene, ethylene or n-propylene group, in particular a methylene or n-propylene residue.

Alkoxysilane-terminated compounds having a methylene group as binding link to the polymer backbone—so-called "alpha-silanes"—have a particularly high reactivity of the terminating silyl group, leading to reduced setting times and thus to very rapid curing of formulations based on these polymers.

In general, a lengthening of the binding hydrocarbon chain leads to reduced reactivity of the polymers. In particular, "gamma-silanes"—which comprise the unbranched propylene residue as binding link—have a balanced ratio between necessary reactivity (acceptable curing times) and delayed curing (open assembly time, possibility of corrections after bonding). By carefully combining alpha- and gamma-alkoxysilane-terminated building blocks, therefore, the curing rate of the systems can be influenced as desired.

Within the context of the present invention, R is most particularly preferably an n-propylene group.

The substituents X, Y and Z are, independently of one another, selected from the group consisting of a hydroxyl group and C1 to C8 alkyl, C1 to C8 alkoxy, and C1 to C8 acyloxy groups, wherein at least one of the substituents X, Y, Z here must be a hydrolyzable group, preferably a C1 to C8 alkoxy or a C1 to C8 acyloxy group, wherein the substituents X, Y and Z are directly bound with the Si atom or the two of the substituents X, Y, Z form a ring together with the Si atom to which they are bound. In preferred embodiments, X, Y and Z are the substituents directly bound with the Si atom. As hydrolyzable groups, preferably alkoxy groups, in particular methoxy, ethoxy, i-propyloxy and i-butyloxy groups, are selected. This is advantageous, since no substances which irritate mucous membranes are released during the curing of compositions comprising alkoxy groups. The alcohols formed by hydrolysis of the residues are harmless in the quantities released, and evaporate. These compositions are therefore suitable in particular for the DIY sector. However, acyloxy groups, such as an acetoxy group —O—CO—CH3, can also be used as hydrolyzable groups.

In preferred embodiments, the alkoxy- and/or acyloxysilane-terminated polymer(s) has/have at least two terminal groups of the general formula (III). Each polymer chain thus comprises at least two linking points at which the condensation of the polymers can be completed, splitting off the hydrolyzed residues in the presence of atmospheric moisture. In this way, regular and rapid crosslinkability is achieved so that bonds with good strengths can be obtained. In addition, by means of the quantity and the structure of the hydrolyzable groups—for example by using di- or trialkoxysilyl groups, methoxy groups or longer residues—the configuration of the network that can be achieved as a long-chain system (thermoplastics), relatively wide-mesh three-dimensional network (elastomers) or highly crosslinked system (thermosets) can be controlled, so that inter alia the elasticity, flexibility and heat resistance of the finished crosslinked compositions can be influenced in this way.

In preferred embodiments, in the general formula (III), X is preferably an alkyl group and Y and Z are, each independently of one another, an alkoxy group, or X, Y and Z are, each independently of one another, an alkoxy group. In general, polymers comprising di- or trialkoxysilyl groups have highly reactive linking points, which permit rapid curing, high degrees of crosslinking and thus good final strengths. The particular advantage of dialkoxysilyl groups lies in the fact that, after curing, the corresponding compositions are more elastic, softer and more flexible than systems comprising trialkoxysilyl groups. They are therefore suitable in particular for use as sealants. In addition, they split off even less alcohol during curing and are therefore of particular interest when the quantity of alcohol released is to be reduced.

With trialkoxysilyl groups, on the other hand, a higher degree of crosslinking can be achieved, which is particularly advantageous if a harder, stronger material is desired after curing. In addition, trialkoxysilyl groups are more reactive and therefore crosslink more rapidly, thus reducing the quantity of catalyst required, and they have advantages in "cold flow"—the dimensional stability of a corresponding adhesive under the influence of force and possibly temperature.

Particularly preferably, the substituents X, Y and Z in the general formula (III) are, each independently of one another, selected from a hydroxyl, a methyl, an ethyl, a methoxy or an ethoxy group, at least one of the substituents being a hydroxyl group, or a methoxy or an ethoxy group, preferably a methoxy group. Methoxy and ethoxy groups as comparatively small hydrolyzable groups with low steric bulk are very reactive and thus permit a rapid cure, even with low use of catalyst. They are therefore of particular interest for systems in which rapid curing is desirable, such as for example in adhesives with which high initial adhesion is required.

Interesting configuration possibilities are also opened up by combinations of the two groups. If, for example, methoxy is selected for X and ethoxy for Y within the same alkoxysilyl group, the desired reactivity of the terminating silyl groups can be adjusted particularly finely if silyl groups carrying exclusively methoxy groups are deemed too reactive and silyl groups carrying ethoxy groups not reactive enough for the intended use.

In addition to methoxy and ethoxy groups, it is of course also possible to use larger residues as hydrolyzable groups, which by nature exhibit lower reactivity. This is of particular interest if delayed curing is also to be achieved by means of the configuration of the alkoxy groups.

The total proportion of the polymers with at least one silicone-containing group, preferably at least one end group, of the general formula (III) in the composition according to the invention is preferably 10 to 80 wt. %, more preferably 10 to 60 wt. %, most preferably 20 to 60 wt. %, based in each case on the total weight of the composition.

Further suitable polymers are those of the general formula (IV):

$$R\text{-}[A\text{-}R^3\text{---}SiR^1_x(OR^2)_{3-x}]_n \qquad (IV),$$

in which R is an organic basic structure, A is an oxygen atom, an alkylene group such as, for example, a methylene group or a carboxy, carbamate, carbonate, ureido, urethane, or sulfonate group, $R^1$ is an alkyl residue having 1 to 4 carbon atoms, $R^2$ is an alkyl residue having 1 to 4 carbon atoms or an acyl residue having 1 to 4 carbon atoms, $R^3$ is a straight-chain or branched, substituted or unsubstituted alkylene residue having 1 to 8 carbon atoms, x=0 to 2, and n=1 to 10,000, wherein the silyl residues are identical or different, and in the case of multiple $R^1$ and/or $R^2$ residues, the latter are respectively identical or different. The silyl-terminated polymers described in WO 2005/047394 A1 and EP 1 093 482 A1 are preferred.

Filler

The composition according to the invention may additionally comprise at least one filler, e.g., selected from chalk, powdered limestone, precipitated and/or pyrogenic silica, zeolites, bentonites, magnesium carbonate, kieselgur (diatomaceous earth), alumina, clay, tallow, titanium oxide, iron oxide, zinc oxide, sand, quartz, flint, mica, powdered glass and other ground minerals. Further suitable fillers are, in particular, silicates such as, for example, natural lamellar magnesium silicate hydrates, natural aluminum silicate hydrates, and natural potassium aluminum hydrates; carbonates such as, for example, natural calcium carbonates in crystalline form or from shell residues, precipitated calcium carbonates, and natural calcium magnesium carbonates; sulfates such as, for example, natural or synthetic barium salts; and a plurality of further substances such as, for example, graphite or micaceous hematite. In preferred embodiments, the filler(s) are precipitated and/or pyrogenic silica. Furthermore, organic fillers can also be used, in particular carbon black, graphite, wood fibers, wood flour, sawdust, cellulose, cotton, pulp, wood chips, chopped straw, chaff, ground walnut shells and other short-cut fibers. Furthermore, short fibers such as glass fibers, glass filament, polyacrylonitrile, carbon fibers, Kevlar fibers or polyethylene fibers can also be added. Aluminum powder is also suitable as a filler. In addition, hollow spheres with a mineral shell or a plastic shell are suitable as fillers. These can be e.g. hollow glass spheres which are commercially available with the trade names Glass Bubbles®. Plastic-based hollow spheres are commercially available, e.g. with the names Expancel® or Dualite®. These are preferably composed of inorganic or organic substances, each with a diameter of 1 mm or less, preferably of 500 μm or less. For some applications, fillers, which make the preparations thixotropic are preferred. These fillers are also described as rheological auxiliaries, for example hydrogenated castor oil, fatty acid amides or swellable plastics such as PVC. So that they can easily be squeezed out of a suitable metering device (e.g. tube), these preparations preferably possess a viscosity of 3000 to 15,000, preferably 4000 to 8,000 mPas or 5000 to 6000 m Pas.

The filler(s) are preferably used in a quantity of 10 to 70 wt. %, more preferably 20 to 60 wt. %, for example 25 to 55 wt. %, in particular 35 to 50 wt. %, based on the total weight of the composition according to the invention. An individual filler or a combination of several fillers can be used.

In one aspect a highly disperse silica with a BET surface area of 10 to 500 m2/g can be used as a filler. The use of such a silica does not bring about a substantial increase in the viscosity of the composition according to the invention but contributes to reinforcing the hardened preparation. By means of this reinforcement, for example the initial strengths, tensile shear strengths and the adhesion of the compositions according to the invention is used are improved. Preferably, uncoated silicas with a BET surface area of less than 100, more preferably less than 65 m2/g, and/or coated silicas with a BET surface area of 100 to 400, more preferably 100 to 300, in particular 150 to 300 and most particularly preferably 200 to 300 m2/g, are used.

In another aspect, zeolites are used. As zeolites, preferably alkali aluminosilicates are used, for example sodium-potassium aluminosilicates of the general empirical formula $aK_2O*bNa_2O*Al_2O_3*2SiO*nH_2O$ with 0<a, b<1 and a+b=1, and n=0 to 10. The pore opening of the zeolite or zeolites used is just large enough to accept water molecules. Accordingly, an effective pore opening of the zeolites of less than 0.4 nm is preferred. Particularly preferably, the effective pore opening is 0.3 nm±0.02 nm. The zeolite(s) is/are preferably used in the form of a powder.

Chalk is preferably used as a filler. Cubic, non-cubic, amorphous and other modifications of calcium carbonate can be used as chalk. Preferably, the chalks used are surface treated or coated. As a coating agent, preferably fatty acids, fatty acid soaps and fatty acid esters are used, for example lauric acid, palmitic acid or stearic acid, sodium or potassium salts of such acids or their alkyl esters. In addition, however, other surface-active substances, such as sulfate esters of long-chain alcohols or alkylbenzenesulfonic acids or their sodium or potassium salts or coupling reagents based on silanes or titanates, are also suitable. The surface treatment of chalks is often associated with an improvement in processability and adhesive strength and the weathering resistance of the compositions. Preferable is an amount of 0.1 to 20 wt. %, preferably 1 to 5 wt. %, based on the total weight of the composition.

Depending on the desired property profile, precipitated or ground chalks or mixtures thereof can be used. Ground chalks can be produced, for example, from natural lime, limestone or marble by mechanical grinding, using either dry or wet methods. Depending on the grinding method, fractions having different average particle sizes can be obtained. Advantageous specific surface area values (BET) are between 1.5 $m^2/g$ and 50 $m^2/g$.

Further suitable examples of fillers are, for example, the Omyacarb chalk grades of the Omya company, or filler particles made of andalusite, sillimanite, kyanite, mullite, pyrophyllite, imogolite, or allophane. Compounds based on sodium aluminates or calcium silicates are also suitable. Also suitable are minerals such as siliceous earth, calcium sulfate (gypsum) that does not derive from flue gas desulfuration units, in the form of the anhydrite, hemihydrate, or dihydrate, quartz flour, silica gel, barium sulfate, titanium dioxide, zeolites, leucite, potassium feldspar, biotite, the group of the soro-, cyclo-, ino-, phyllo-, and tectosilicates, the group of the poorly soluble sulfates such as gypsum, anhydrite, or barium sulfate, as well as calcium minerals such as calcite or chalk ($CaCO_3$). The aforesaid inorganic materials can be used individually. It is as well possible, however, to use a mixture of two or more of the aforesaid compounds.

Auxiliary Substances

The compositions according to the present invention can further contain one or more auxiliary substances. In the following suitable auxiliary substances are disclosed.

The compositions according to the invention can comprises as an additional component at least one compound of the general formula (V)

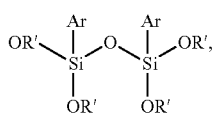

(V)

wherein R' is same or different and is, independently from one another, selected from the group consisting of a hydrogen atom and hydrocarbon residues having 1 to 12 carbon atoms, and Ar is selected from aryl groups. In preferred embodiments, the aryl group is a phenyl group and/or R' in the general formula (V) is selected from a methyl or ethyl group, more preferably a methyl group. The most preferred is diphenyltetramethoxydisiloxane. When using the at least one compound of the general formula (V) above, the compositions according to the invention have an improved tensile strength and elongation.

The proportion of compound of the general formula (V) in the composition according to the invention is preferably 1 to 60 wt.-%, more preferably 2 to 50 wt.-% based on the total weight of the composition. In preferred embodiments, the composition according to the invention comprises at least one compound of the general formula (V) in an amount of 20 to 60 wt.-%, more preferably 20 to 50 wt.-%, most preferably 30 to 50 wt.-% based on the total weight of the composition. In alternatively preferred embodiments, the composition according to the invention comprises at least one compound of the general formula (V) in an amount of 1 to 50 wt.-%, more preferably 2 to 40 wt.-%, most preferably 4 to 30 wt.-% based on the total weight of the composition.

The composition according to the invention may further comprise at least one silicone oligomer of the general formula (VI)

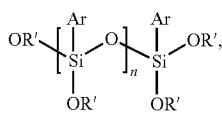

(VI)

wherein R' is same or different and is, independently from one another, selected from the group consisting of a hydrogen atom and hydrocarbon residues having 1 to 12 carbon atoms, preferably a methyl or ethyl group, more preferably a methyl group, Ar is selected from aryl groups, preferably a phenyl group, and n is an integer selected from 2 to 10, preferably 2 to 4, more preferably 2 to 3, most preferably 3.

To reduce the viscosity of the composition according to the invention, solvents can also be used. Suitable as solvents are aliphatic or aromatic hydrocarbons, halogenated hydrocarbons, alcohols, ketones, ethers, esters, ester alcohols, keto alcohols, keto ethers, keto esters and ether esters. Preferably, however, alcohols are used since in this case the storage stability increases. C1-C10 alcohols are particularly preferred, particularly methanol, ethanol, i-propanol, isoamyl alcohol and hexanol.

The composition according to the invention can additionally comprise an adhesion promoter. An adhesion promoter is understood to be a substance, which improves the adhesion properties of adhesive layers on surfaces. It is possible to use conventional adhesion promoters known to the person skilled in the art (tackifiers) individually or as a combination of several compounds. Suitable examples are resins, terpene oligomers, coumarone/indene resins, aliphatic, petrochemical resins and modified phenolic resins. Suitable within the framework of the present invention are, for example, hydrocarbon resins, as obtained by polymerization of terpenes, principally α- or β-pinene, dipentene or limonene. The polymerization of these monomers generally takes place cationically with initiation by Friedel-Crafts catalysts. The terpene resins also include copolymers of terpenes and other monomers, e.g., styrene, α-methylstyrene, isoprene and the like. The above resins are used, e.g., as adhesion promoters for pressure-sensitive adhesives and coating materials. Also suitable are the terpene-phenolic resins, which are produced by acid-catalyzed addition of phenols to terpenes or rosin. Terpene-phenolic resins are soluble in most organic solvents and oils and are miscible with other resins, waxes and rubber. Likewise, within the framework of the present invention, the rosins and derivatives thereof, for example their esters or alcohols, are suitable as adhesion promoters in the above sense. Silane adhesion promoters, in particular aminosilanes, are particularly suitable.

In a special embodiment of the composition according to the invention, the composition encompasses a silane of the general formula (VII)

$$R^{1'}R^{2'}N-R^{3'}-SiXYZ \quad (VII)$$

as adhesion promoter, wherein $R^{1'}$ and $R^{2'}$ are, independently of one another, a hydrogen or C1 to C8 alkyl residues, R3' is a divalent hydrocarbon residue having 1 to 12 carbon atoms, optionally comprising a heteroatom, and X, Y, Z are, each independently of one another, selected from a hydroxyl group or C1 to C8 alkyl, C1 to C8 alkoxy or C1 to C8 acyloxy groups, at least one of the substituents X, Y, Z being a C1 to C8 alkoxy or C1 to C8 acyloxy group. Compounds of this type naturally exhibit a high affinity to the binding polymer components of the composition according to the invention, but also to a wide range of polar and nonpolar surfaces, and therefore contribute to the formation of a particularly stable bond between the adhesive composition and the particular substrates to be bonded. The linking group $R^{3'}$ can, for example, be a linear, branched or cyclic, substituted or unsubstituted alkylene residue. Nitrogen (N) or oxygen (O) may be contained therein as a heteroatom. If X, Y and/or Z are an acyloxy group, this can be, e.g., the acetoxy group —OCO—CH$_3$.

One or more adhesion promoter(s) is/are preferably contained in the composition according to the invention in a quantity of 0.1 to 10 wt. %, more preferably 0.2 to 5 wt. %, in particular 0.3 to 3 wt. %, based on the total weight of the composition.

The composition according to the invention can additionally comprise UV stabilizers. Preferably, the proportion of the UV stabilizers in the composition according to the invention is up to about 2 wt. %, in particular up to 1 wt. %. Particularly suitable as UV stabilizers are the so-called hindered amine light stabilizers (HALS). For example, a UV stabilizer can be used which carries a silyl group and is incorporated into the end product during crosslinking or curing. Furthermore, benzotriazoles, benzophenones, benzoates, cyanoacrylates, acrylates, sterically hindered phenols, phosphorus and/or sulfur can also be added. The composition according to the invention preferably comprises at least one bis(piperidyl) dicarboxylic acid diester, for example bis(2,2,6,6-tetramethyl-4-piperidyl) sebacate.

It is often useful to stabilize the composition according to the invention further against moisture penetration in order to increase the shelf life even more. Such an improvement in shelf life can be achieved, for example, by the use of drying agents. Suitable as drying agent are all compounds that react with water to form a group that is inert towards the reactive groups present in the composition while undergoing the smallest possible changes in their molecular weight. Furthermore, the reactivity of the drying agents towards moisture that has penetrated into the composition must be higher than the reactivity of the end groups of the silyl group-containing polymer according to the invention present in the composition. Isocyanates, for example, are suitable as drying agent.

Advantageously, silanes are also used as drying agent, e.g., vinylsilanes such as 3-vinylpropyltriethoxysilane, oxime silanes such as methyl-O,O',O"-butan-2-one trioximosilane or O,O',O",O'"-butan-2-one tetraoximosilane (CAS no. 022984-54-9 and 034206-40-1) or benzamidosilanes such as bis(N-methylbenzamido)methylethoxysilane (CAS no. 16230-35-6) or carbamatosilanes such as carbamatomethyltrimethoxysilane. However, the use of methyl-, ethyl- or vinyltrimethoxysilane, tetramethyl- or tetraethylethoxysilane is also possible. Particularly preferred here are vinyltrimethoxysilane and tetraethoxysilane in terms of efficiency and costs. Also suitable as drying agent are the above-mentioned reactive diluents, provided that they have a molecular weight (Mn) of less than about 5,000 g/mol and terminal groups whose reactivity with penetrating moisture is at least as great as, preferably greater than, the reactivity of the reactive groups of the silyl group-containing polymer according to the invention. Finally, alkyl orthoformates or orthoacetates can also be used as drying agent, for example methyl or ethyl orthoformate or methyl or ethyl orthoacetate. Generally, the composition according to the invention preferably comprises 0.01 to 10 wt. % drying agent, based on the total weight of the composition.

The term "auxiliary substances" covers components that are present in minor quantities, for example curing catalysts, adhesion promoters, water scavengers, UV stabilizers, anti-ageing agents, rheological auxiliaries, pigments or pigment pastes, fungicides, flame retardants and/or solvents.

The thickening agents used in the structural adhesive according to the present invention are by preference high-molecular-weight, usually organic substances that absorb liquids such as, for example, water and/or organic solvents, and thereby swell up or form intermolecular lattice structures. Fillers that absorb liquids and thereby swell up or form intermolecular lattice structures, i.e., act as a thickening agent or thickener, are regarded as thickening agents in the context of the present invention.

Thickening agents to be mentioned are, in particular, organic natural compounds such as, for example, agar-agar, carrageenan, tragacanth, gum arabic, alginates, pectins, polyoses, guar flour, locust bean flour, starch, dextrins, gelatins, and casein; modified organic natural substances such as, for example, carboxymethyl celluloses and other cellulose ethers, hydroxyethyl cellulose, hydroxypropyl cellulose, and the like, as well as seed flour ethers, hardened castor oil, stearic acid; entirely synthetic organic compounds such as polyacrylates and polymethacrylates, vinyl polymers, polycarboxylic acids, polyethers, polyimines, and polyamides; and inorganic compounds such as, for example, polysilicic acids, and silicic acids.

Examples of organic thickening agents are also, among others, (aqueous solutions of) copolymers based on acrylic acid and/or acrylamide, for example emulsified in an oil fraction, in particular a mineral oil fraction. Concrete examples of a w/o emulsion are Collacral HP of the BASF company, as well as Texipol grades of the Scott-Bader company. Further commercially obtainable thickening agents are, for example, Disparlon® grades, for example Disparlon® 6500. Other organic thickening agents are, for example, the water-soluble polyurethane thickener Nopco DSX 3290 from Cognis, associative thickeners such as, for example, Indunal T 112 of the Indulor Chemie company, which is an aqueous solution of the terpolymer of acrylates and methacrylates and of carboxyl-group-containing comonomers (this being an anionic associative thickener), alkali-swellable thickeners such as, for example, the acrylate polymer dispersion Acrysol TT 615 from Rohm & Haas (which is an alkali-swellable anionic dispersion having a solids content of approx. 30 wt. %), and polymer dispersions based on acrylic acid and acrylamide.

Nonreactive thickeners such as amide waxes, for example Crayvallac SLX from Cray Valley, are particularly suitable as organic thickening agents.

Examples of inorganic thickening agents are preferably highly dispersed, in particular pyrogenic silicic acids, in either hydrophilic or hydrophobic form. The preferred hydrophilic silicic acid is water-wettable and occurs upon flame hydrolysis. Hydrophobic silicic acid is obtained therefrom, for example by reaction with organosilanes. The surface area is by preference in the range from 125 to 400 $m^2/g$, measured with the BET method according to DIN ISO 9277:2014-01. Highly dispersed silicic acid can be used both as a powder and as an aqueous dispersion. Examples are HDK of the Wacker company, and Aerosil of the Degussa-Huls company.

The preferred concentration of thickening agents, based on the total weight of the composition, is 5 to 50 wt.-%, particularly preferably 5 to 40, and very particularly preferably 8 to 40 wt. % or 10 to 35 wt. %.

The flow limit of the compositions is preferably adjusted at least to a value of at least 1500 Pa. As indicated above, however, this value is preferably higher, and can be equal, for example, to at least 1800 Pa, particularly preferably at least 2000, 2500, 3000, 4000, 6000, 8000, or more than 10,000 Pa such as, for example, 12,000 Pa.

By preference, the composition is thickened with the thickening agent until its consistency is dimensionally stable and the structural adhesive compound is kneadable. An addition of thickening agent and/or filler proceeding beyond this may be advisable for economic reasons, since thickening agents and fillers are usually more inexpensive than the binder contained in the structural adhesive. An upper limit is reached only as a result of the wettability of the substrates to be adhesively bonded. If the concentrations of thickening agent and/or filler are too high, the wettability of the substrates to be bonded becomes reduced, and the adhesive bonding result is insufficient. The upper limit can easily be ascertained for each substrate with a few experiments.

As further additives, the composition according to the present invention can contain, for example, curing catalysts such as dibutyl tin dilaurate (DBTL), dyes, and pigments. Pigments that absorb liquids and thereby swell up or form intermolecular lattice structures, i.e. act at thickening agents or thickeners, are regarded as thickening agents in the context of the present invention.

The production of the composition according to the invention takes place by known methods by intimate mixing of the components in suitable dispersing apparatus, for example a high-speed mixer.

All compositions disclosed herein can be used as herein described, for example in the methods disclosed herein.

EXAMPLES

Reagents and solvents were obtained from commercial sources and used as received unless noted otherwise.

$^{29}$Si NMR spectra were recorded on a Bruker AV400. $^{29}$Si-NMR spectra were referenced w.r.t. tetramethylsilane (TMS). Chemical shifts are in ppm.

HR-MS measurements were recorded on an Agilent 6210 time-of-flight LC/MS (ESI), peaks as listed correspond to the highest abundant peak and are of the expected isotope pattern.

For the quantification of C/H/N/S, a microanalyzer-TruSpec CHNS from the company Leco was used.

Tensile properties (extension to break) were measured according to DIN EN ISO 8339:2005-09. The materials were measured 7 days after curing on a machine from Zwick, for examples Zwick Z010.

Shore A hardness was determined according to DIN EN ISO 868:2003-10. The probe is applied with a coating knife (width 2 cm/height 1 cm). 1 day and 7 days after curing the hardness is measured with a durometer and the through hardening with a caliper.

Skin over time (SOT): The building of a skin (skin over time) was measured as follows. A film of the composition is applied with a spatula (length 5 cm/width 3 cm/height 2 mm) on a flat surface (sheet) and every 2 to 3 minutes it is tested if a skin has been formed. This can be done via fingers or a polyethylene film which is carefully placed onto the film and for 5 seconds charged with a 20 g weight. The skin building time is reached if no film remains on the finger or polyethylene film. The whole procedure is performed at 23° C. at a humidity of 50%. The unit employed is minutes.

Example 1 (Compound A)

Methyl ((3-(trimethoxysilyl)propyl)thio)octadecanoate—Oleic Acid Methyl Ester Adduct

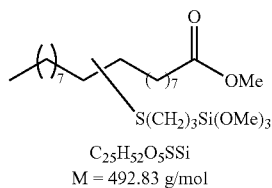

$C_{25}H_{52}O_5SSi$
M = 492.83 g/mol

Under argon, an oven dried 250 mL Schlenk round bottom flask was charged with methyl oleate (MO, 100 g, 337 mmol), (3-mercaptopropyl)trimethoxysilane (MPTSM, 125.4 mL, 132.5 g, 675 mmol, 2 equiv. w.r.t. MO), and (2,2'-azobis(2-methylpropionitrile)) (AIBN, 1.46 g, 0.9 mmol, 2.4 mol % w.r.t. MO) and stirred in a preheated oil bath at 85° C. for 18 h. The reaction mixture was allowed to cool to room temperature, excess MPTSM was removed under reduced pressure. The product was obtained in 84% yield (155 g, 314.5 mmol) as a yellowish oil without further purification.

$^{29}$Si NMR (79.5 MHz, CDCl$_3$): δ=−42.29 ppm. HRMS (ESI+): m/z calculated for C25H52O5SSi: 492.3305; found: 515.3195 [M+Na]+. EA calculated for C25H52O5SSi: C, 60.93; H, 10.64; S, 6.50 found: C, 61.01; H, 10.36; S, 6.37.

Example 2 (Compound B)

Glyceryl Trioleate—MPTSM Adduct

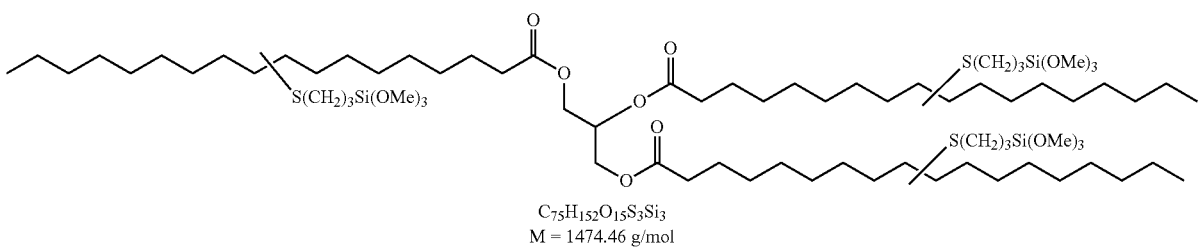

$C_{75}H_{152}O_{15}S_3Si_3$
M = 1474.46 g/mol

Under argon, an oven dried 50 mL Schlenk flask was charged with glyceryl trioleate (GTO, 14 mL, 12.74 g, 14.39 mmol), (3-mercaptopropyl)trimethoxysilane (MPTSM, 16.0 mL, 16.9 g, 86.34 mmol, 6 equiv. w.r.t. GTO), and (2,2'-azobis(2-methylpropionitrile)) (AIBN, 72 mg, 0.43 mmol, 3 mol % w.r.t. MO) and stirred in a preheated oil bath at 85° C. for 25 h. The reaction mixture was allowed to cool to room temperature, excess MPTSM was removed under reduced pressure. The product was obtained in 94% yield (20 g, 13.6 mmol) as a yellowish oil without further purification.

$^{29}$Si NMR (79.5 MHz, CDCl3): δ=−42.24 ppm. HRMS (ESI+): m/z calculated for C75H152O15S3Si3: 1472.9601;

found: 1495.9484 [M+Na]+. EA calculated for C75H152O15S3Si3: C, 61.10; H, 10.39; S, 6.52; found: C, 61.01; H, 10.68; S, 6.45.

Example 3 (Compound C)

Linseed Oil—MPTSM Adduct

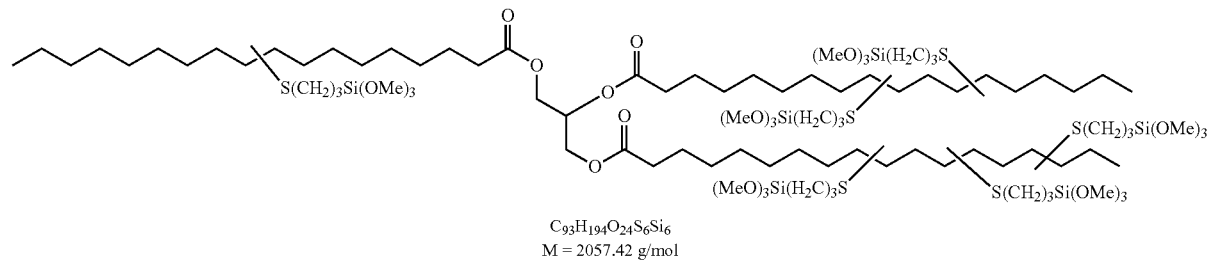

$C_{93}H_{194}O_{24}S_6Si_6$
M = 2057.42 g/mol

Under argon, an oven dried 500 mL Schlenk flask was charged with linseed oil (LSO, 35 mL, 32.6 g), (3-mercaptopropyl)trimethoxysilane (MPTSM, 350 mL, 370 g, 1.88 mol), and (2,2'-azobis(2-methylpropionitrile)) (AIBN, 6.2 g, 37.8 mmol, 20 wt. % w.r.t. LSO) and stirred in a preheated oil bath at 85° C. The reaction progress was monitored by $^1$H NMR. After 16 h an additional portion of AIBN (3.1 g) was added to the reaction mixture. After 41 h at 85° C. the reaction mixture was allowed to cool to room temperature, excess MPTSM was removed under reduced pressure. 106 g of a yellow oil was obtained as product.

EA calculated for $C_{93}H_{194}O24S6Si6$: C, 54.29; H, 9.50; 0, 18.66; S, 9.35; found: C, 54.07; H, 10.45; S, 9.86.

Preparation Example 1

Polymer 1 (gamma-silane-terminated polymer): 282 g (15 mmol) of polypropylene glycol 18000 (hydroxyl value=6.0) was dried in a 500 ml three-neck flask at 80-90° C. under vacuum. Under a nitrogen atmosphere at 80° C., 0.1 g of dibutyltin laurate was added, and 7.2 g (32 mmol) 3-isocyanatopropyltrimethoxysilane (% NCO=18.4) was then added to it. After stirring for one hour at 80° C., the resulting polymer was cooled. After adding 3 g light stabilizer (Tinuvin 770 DF) and 6 g Geniosil XL 10 to the reactor while stirring and homogenizing for 10-30 minutes at 80° C., the resulting polymer was stored in a moisture-proof glass vessel under a nitrogen atmosphere before being processed further into a composition.

Example 4 (Adhesives)

The formulations were prepared in a SpeedMixer, e.g., SpeedMixer DAC 400 FVZ of Hauschild Engineering For the formulations A to D Polymer 1 (22.5 g) and the respective plasticizer (comparative DIUP (Diisoundecyl-Phthalat), 19.8 g) (A); or one of the reactive plasticizer of examples 1 to 3 (B)-(D), 19.8 g) were homogenized with a spatula in a 600 ml Speedmixer can. After that calcium carbonate (Eskal 30, 92.5 g), a rheology modifier (Rilanit Micro Spezia) (hardened castor oil; (12R)-12-Hydroxyoctadecanoic acid, 9.8 g) and a stabilizer (Tinuvin 328, 0.3 g) were added and the composition was mixed for 60 seconds at 2300 rpm. It was tested if the can reached about 37° C. (body temperature), if not, the mixing step was repeated. Thereafter, the composition was cooled to room temperature for 15 minutes. After that, Vinyltrimethoxysilane (Geniosil XL10, 2.6 g) and Aminosilane (Geniosil GF96, 1.4 g) were added to the composition and mixed for 60 seconds at 2300 rpm, respectively. Finally, the catalyst (DOTL; octyl tin laurate catalyst, 1.1 g) was added to the composition and the composition was filled in a 150 ml PE cartridge.

The compounds of examples 1 to 3 were all compatible with the other compounds of the composition.

The compositions were mixed and cured for 7 days under room temperature without any prior storage period. After curing certain properties and their adhesion to different substrates was evaluated (Table 1).

In further examples, identical compositions were stored at 40° C. for 4 weeks in order to simulate an ageing of at least 1 year. After that, the samples were cured for 7 days under room temperature. After curing certain properties and their adhesion to different substrates was evaluated (Table 2).

Visual observation resulted in no differences between stored and not stored products. However, it was surprisingly found that the mechanical characteristics (tensile strength and elongation) of cured products after storage at 40° C. for 4 weeks showed different mechanical properties compared to the products that have not been stored before curing. New reactive plasticizer result in either higher elasticity, when compound A is used or higher tensile strength, when compounds B and C are used.

TABLE 1

| | without storage | | | |
|---|---|---|---|---|
| | Comparative Example (A) | Composition with Compound (B) | Composition with Compound (C) | Composition with Compound (D) |
| SOT [min] | 13 | 18 | <60 | 13 |
| Shore after 1 day | 20 | 14 | 2 | 26 |
| Through hardening after 1 day | 1.4 | 1.1 | 0.67 | 1.3 |

TABLE 1-continued

| | | without storage | | |
|---|---|---|---|---|
| | Comparative Example (A) | Composition with Compound (B) | Composition with Compound (C) | Composition with Compound (D) |
| Shore after 7 days | 62 | 74 | 29 | 80 |
| Through hardening after 7 days | completely | completely | completely | completely |
| Remarks | Base value | brittle | a bit softer than Comp. Ex. (A) | brittle |
| Adhesion on | | | | |
| ABS | af 3 | af 3 | af 3 | cf 100/brittle |
| PVC white | cf 100 | cf 100/brittle | cf 100 | cf 100/brittle |
| PS | af 3 | cf 100/brittle | cf 60 | cf 100/brittle |
| PMMA (blue) | af 3 | cf 100/brittle | cf 100 | af 3 |
| Max tensile strength [N/mm$^2$] | 2.18 | 2.13 | 2.04 | 1.75 |
| Max elongation [%] | 170 | 175 | 144 | 172 | cf (integer from 100 – 50) = 100 – 50% of the applied composition remains on substrate (number indicates percentage)
af 1 = composition was very difficult to remove, but completely removed from substrate af 3 = composition was easily (3) removed from substrate (completely).

TABLE 2

| | | after 4 weeks 40° C. storage | | |
|---|---|---|---|---|
| | Comparative Ex (A) | Composition with Compound (B) | Composition with Compound (C) | Composition with Compound (D) |
| SOT [min] | 9 | 15 | <60 | 10 |
| Shore after 1 day | 31 | 21 | 7 | 47 |
| Through hardening after 1 day | 1.78 | 1.25 | 1.25 | 1.83 |
| Shore after 7 days | 65 | 75 | 53 | 68 |
| Through hardening after 7 days | completely | completely | completely | completely |
| Remarks | Base value | brittle | a bit softer than Comparative Ex. (A) | brittle |
| Adhesion on | | | | |
| ABS | cf 80 | cf 100/brittle | cf 100 | cf 100/brittle |
| PVC white | cf 10 | cf 100/brittle | cf 60 | cf 100/brittle |
| PS | cf 100 | cf 100/brittle | cf 40 | cf 100/brittle |
| PMMA (blue) | cf 100 | cf 100/brittle | cf 100 | af 3 |
| Max tensile strength [N/mm$^2$] | 1.58 | 3.53 | 1.04 | Too brittle to measure the mechanical properties |
| Max elongation [%] | 78 | 10 | 166 | Too brittle to measure the mechanical properties | cf (integer from 100 – 50) = 100 – 50% of the applied composition remains on substrate (number indicates percentage)
<cf 50 = less than 50% adhesion
af 3 = composition was easily removed from substrate (completely).

The invention claimed is:
1. A liquid plasticizer compound according to formula (I)

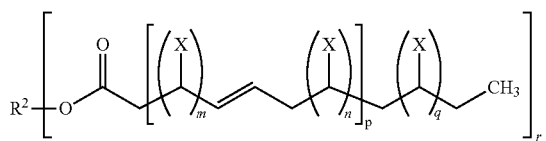

(I)

wherein
m=0 to 25;
n=0 to 25;
q=0 to 50;
p=0 to 5;
r=1 to 3;
whereby in each unit p or r the respective m, n, and q can be independently selected;
X is independently selected from H or —SR$^1$, wherein 1 to 10 —SR$^1$ are present and
R$^1$=—(CH$_2$)$_{1-10}$Si(O(CH$_2$)$_{0-8}$CH$_3$)$_3$, with the proviso that if two or more —SR$^1$ are present they are not bound to neighboring carbon atoms and that the —SR$^1$ groups are not bound to carbon atoms bound to the neighboring carbon atom by a double bond; and $R^2$=substituted or unsubstituted aliphatic $C_{1-12}$ hydrocarbon group, wherein the liquid plasticizer compound is derived from a plant oil and free to be added into a composition.

2. The compound according to claim 1, wherein the compound of formula (I) is derived from an oil selected from one or more of rapeseed oil, soy bean oil, castor oil, palm oil, palm kernel oil, tall oil, jatropha oil, candle nut oil, grapeseed oil, sunflower oil, mid oleic sunflower oil, high oleic sunflower oil, canola oil, corn oil, cashew nut oil and synthetic triglycerides.

3. The compound according to claim 1, wherein the compound has alkoxysilane groups capable of reacting with functional groups of the composition upon curing.

4. The compound according to claim 1, wherein p=1 to 3.

5. The compound according to claim 1, wherein p=0; and q=2 to 50.

6. The compound according to claim 5, wherein r=1.

7. The compound according to claim 1, wherein r=3 and 1 to 5 —$SR^1$ are present.

8. The compound according to claim 7, wherein 1 to 2 —$SR^1$ are present.

9. The compound according to claim 1, wherein
p=1 to 3;
m=1 to 25;
n=1 to 25; and
q=0.

10. The compound according to claim 9, wherein r=3.

11. The compound according to claim 9, wherein
$R^1$=—$(CH_2)_{1-5}Si(O(CH_2)_{0-3}CH_3)_3$; and
$R^2$=a saturated unsubstituted aliphatic $C_{1-12}$ hydrocarbon group.

12. The compound according to claim 9, wherein
$R^1$=—$(CH_2)_3Si(OCH_3)_3$ or —$(CH_2)_3Si(O(CH_2)_2CH_3)_3$,
with the proviso that if two or more —$SR^1$ are present they are not bound to neighboring carbon atoms and that the —$SR^1$ groups are not bound to carbon atoms bound to the neighboring carbon atom by a double bond and not bound to carbon atoms in alpha position to a double bond; and
$R^2$=a saturated unsubstituted aliphatic $C_{1-6}$ hydrocarbon group.

13. A method for producing a compound according to claim 1, comprising steps of:
reacting a compound according to formula (II)

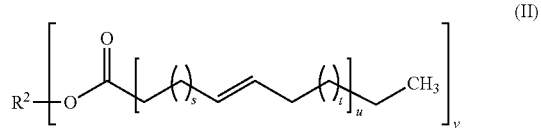

wherein
s=0 to 101;
t=0 to 101;
u=1 to 20;
v=1 to 3; and $R^2$ is defined as in claim 1
with a compound $HSR^1$, whereby $R^1$ is defined as in claim 1, in the presence of a catalyst.

14. The method according to claim 13, wherein the reaction is performed at a temperature of 30 to 100° C.

15. A method of making an adhesive or sealant composition comprising including at least one compound according to claim 1 as a reactive plasticizer.

16. An adhesive or sealant composition, comprising
A) at least one silyl terminated polymer;
B) at least one compound according to claim 1;
C) optionally at least one filler; and
D) optionally one or more auxiliary substances.

17. The adhesive or sealant composition according to claim 16, wherein the at least one compound B is present in an amount of about 0.1 to 30 wt.-%, based on the total weight of the composition.

18. The adhesive or sealant composition according to claim 16, wherein the composition comprises:
10 to 80 wt.-% of A);
0.1 to 30 wt.-% of B);
0 to 70 wt.-% of C); and
0 to 60 wt.-% of D).

19. The adhesive or sealant composition according to claim 18, wherein the composition comprises:
15 to 35 wt.-% of A);
1 to 10 wt.-% of B);
30 to 50 wt.-% of C); and
1 to 10 wt.-% of D).

20. A compound according to formula (I)

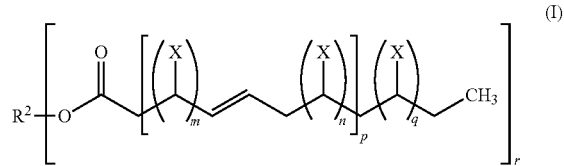

wherein m=0 to 25, n=0 to 25, q=0 to 50, p=0 to 5, and r=1 whereby in each unit r the respective m, n, and q can be independently selected; X is independently selected from H or —$SR^1$ whereby 1 to 10 —$SR^1$ are present and $R^1$=—$(CH_2)_{1-10}Si(O(CH_2)_{0-8}CH_3)_3$ with the proviso that if two or more —$SR^1$ are present they are not bound to neighboring carbon atoms and that the —$SR^1$ groups are not bound to carbon atoms bound to the neighboring carbon atom by a double bond; and
$R^2$=substituted or unsubstituted aliphatic $C_{1-12}$ hydrocarbon group.

21. The compound according to claim 1, wherein $R^2$ is a substituted hydrocarbon group wherein the substituents are selected from —OH, —$OCH_3$, —F, —Cl, —Br, —I, =O, —$NO_2$, or —$NH_2$.

22. The compound according to claim 1, wherein the compound has a viscosity.

* * * * *